United States Patent [19]
White

[11] Patent Number: 4,889,389
[45] Date of Patent: Dec. 26, 1989

[54] SEAT WITH THREE POINT USER RESTRAINT

[75] Inventor: David A. White, White Pigeon, Mich.; James W. Hofrichter, Reedsburg; Harold J. Van Duser, Reedsburg, both of Wis.

[73] Assignee: Grumman Allied Industries, Inc., Sturgis, Mich.

[21] Appl. No.: 291,384

[22] Filed: Dec. 23, 1988

Related U.S. Application Data

[63] Continuation of Ser. No. 108,058, Oct. 13, 1987, abandoned.

[51] Int. Cl.$^4$ ............................................. A62B 35/00
[52] U.S. Cl. ................................. 297/468; 297/483; 297/345
[58] Field of Search .............. 297/468, 345, 346, 216, 297/483, 475, 476

[56] References Cited

U.S. PATENT DOCUMENTS

| | | | |
|---|---|---|---|
| 2,655,981 | 10/1953 | Whittingham et al. | 297/345 X |
| 3,237,906 | 3/1966 | Heyl | 297/345 X |
| 3,642,088 | 2/1972 | Smith | 297/345 X |
| 3,761,127 | 9/1973 | Giese et al. | 297/346 X |
| 4,033,622 | 7/1977 | Boudreau | 297/250 |
| 4,238,135 | 12/1980 | Sandham | 297/349 |
| 4,289,352 | 9/1981 | Ashworth | 297/468 X |
| 4,431,233 | 2/1984 | Erust | 297/468 |

FOREIGN PATENT DOCUMENTS 3529697  3/1986  Fed. Rep. of Germany ...... 297/483

Primary Examiner—Francis K. Zugel
Attorney, Agent, or Firm—Richard G. Geib; Daniel Jay Tick; Bernard S. Hoffman

[57] ABSTRACT

A seat with integral three point user restraint which has a seat and a three point restraint system for restraining the user to the seat, the three point restraint system is mounted entirely and directly to the seat, the seat and the three point restraint system together form a self contained integral unit so that the seat is adaptable to different installations without relocating the three point restraint system.

2 Claims, 1 Drawing Sheet

SEAT WITH THREE POINT USER RESTRAINT

This is a continuation of co-pending application Ser. No. 108,058 filed on Oct. 13, 1987 abandoned.

BACKGROUND OF THE INVENTION

1. Field of the Invention

The present invention relates to a seat with a user restraint. More particularly, the present invention relates to a seat with a user restraint which has a sitting portion and a user restraining system.

2. Description of the Prior Art

Seats with a user restraint of the above mentioned general type are known in the art. One such seat with a user restraint is disclosed, for example, in a seat with an integral two point user restraint, shown in FIG. 1. The existing two point, or lap belt only, restraint system, however, has one main disadvantage. It does not offer maximum protection to the user during frontal or side impacts. A user who is belted only at the hips can rotate the torso forward or sideways during an impact. This would allow the user to strike the steering wheel or other vehicle components.

Another such seat with a user restraint is disclosed, for example, in a seat with a three point user restraint. A conventional three point, or lap and shoulder belt system, consists of attaching the retractor to part of the vehicle structure beside or below the seat and passing the belt through a "D" loop mounted on the vehicle structure above and behind the user's shoulder. The end of the belt being fixed to a point near the retractor. A tongue which is free to slide is located on the belt between the fixed end and the "D" loop. When the tongue is drawn across the body of the user and latched into the buckle, the seat belt lays across the hips as well as the chest of the user. However, during an impact the belt will stretch and undergo spool down. Spool down is a tightening of the belt on the spool as the end of the belt is pulled. The spool itself is locked and will not turn, but the belt will play out of the retractor as the belt tightens on the spool. These two phenomena increase as belt length increases. The longer the belt, the more belt is stored on the spool. Belt stretch is a percentage of the belt used, so that the longer a belt is the longer it will stretch. If the shoulder belt spools out before it can retain the user then no advantage is gained by using it. The user's torso would still travel far enough to strike vehicle components. To be most effective a three point user restraint system requires minimal belt length. Since a walk-in van requires extreme belt lengths because the anchorages are on the vehicle structure, the variety of body sizes as well as driver locations which vary with chassis, would require a different three point user restraint system for each type of application.

SUMMARY OF THE INVENTION

Accordingly, it is an object of the present invention to provide a seat with integral three point user restraint which avoids the disadvantages of the prior art.

More particularly, it is an object of the present invention to provide a seat with integral three point user restraint which is versatile and may be installed in any vehicle or the like or any chassis or the like and therefore maximize effectiveness and reduce cost and whose user restraint is a three point system mounted entirely and directly on the seat which minimizes belt length which reduces belt stretch and spool down.

In keeping with these objects, and with others which will become apparent hereinafter, one feature of the present invention resides, briefly stated, in a seat with integral three point user restraint which has means for sitting and wherein there is provided a three point restraint system for restraining the user to the sitting means and which is mounted entirely and directly to the sitting means so that the sitting means and the three point restraint system together form a self contained integral unit.

When the seat with integral three point user restraint is designed in accordance with the present invention, the sitting means is adaptable to different installations without relocating the three point restraint system.

In accordance with another feature of the present invention, the sitting means include a frame.

Another feature of the present invention is that the frame includes a seat pedestal which has a front and a side, a seat holder, and a "D" loop mounting arm which has a free end and a fixed end, and the seat holder is attached to the front of the seat pedestal and the fixed end of the mounting arm is attached to the side of the seat pedestal.

Yet another feature of the present invention is that the frame further includes a brace that is attached to the side of the seat pedestal and the mounting arm so that the mounting arm is further supported.

Still yet another feature of the present invention is that the frame further includes means for mounting the seat holder to a surface.

Yet still another feature of the present invention is that the mounting means include a seat socket.

Another feature of the present invention is that the seat holder is adjustable so that the height of the seat pedestal relative to the surface is variable to suit user needs.

Still another feature of the present invention is that the seat holder is manually adjustable.

Yet another feature of the present invention is that the frame further includes a "D" loop mounting bracket that is fixedly attached to the free end of the mounting arm.

Still yet another feature of the present invention is that the frame further includes a retractor mounting bracket that is attached to the side of the seat pedestal.

Another feature of the present invention is that the three point restraint system includes a belt with a length that is minimal due to the three point restraint system being mounted entirely and directly to the sitting means, and the minimal length of the belt reduces stretching and spool down of the belt.

Still another feature of the present invention is that the three point restraint system further includes a belt retractor mounted to the retractor mounting bracket of the frame and which forms the first point of the three point restraint system.

Yet another feature of the present invention is that the three point restraint system further includes a belt buckle mounted to the frame.

Still yet another feature of the present invention is that the three point restraint system further includes a tongue which is slidable on the belt and together with the buckle form the second point of the three point restraint system.

Finally still a further feature of the present invention is that the three point restraint system further includes a "D" loop mounted to the "D" loop mounting bracket of the frame and forming the third point of the three point restraint system.

The novel features which are considered characteristic for the invention are set forth in particular in the appended claims. The invention itself, however, both as to its construction and its method of operation, together with additional objects and advantages thereof, will be best understood from the following description of the specific embodiment when read in connection with the accompanying drawings.

DETAILED DESCRIPTION OF THE PREFERRED EMBODIMENT

Figure 1:
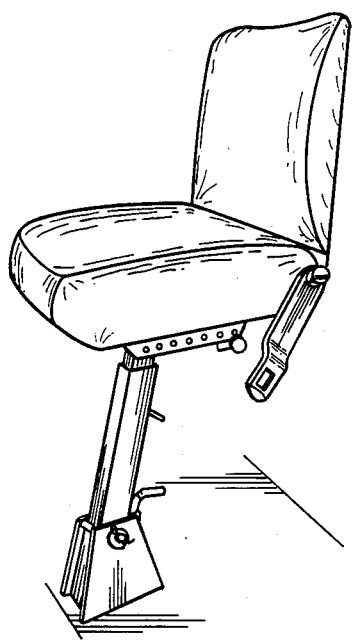
FIG. 1 is a perspective view of a prior art seat with integral two point user restraint.
Figure 2:
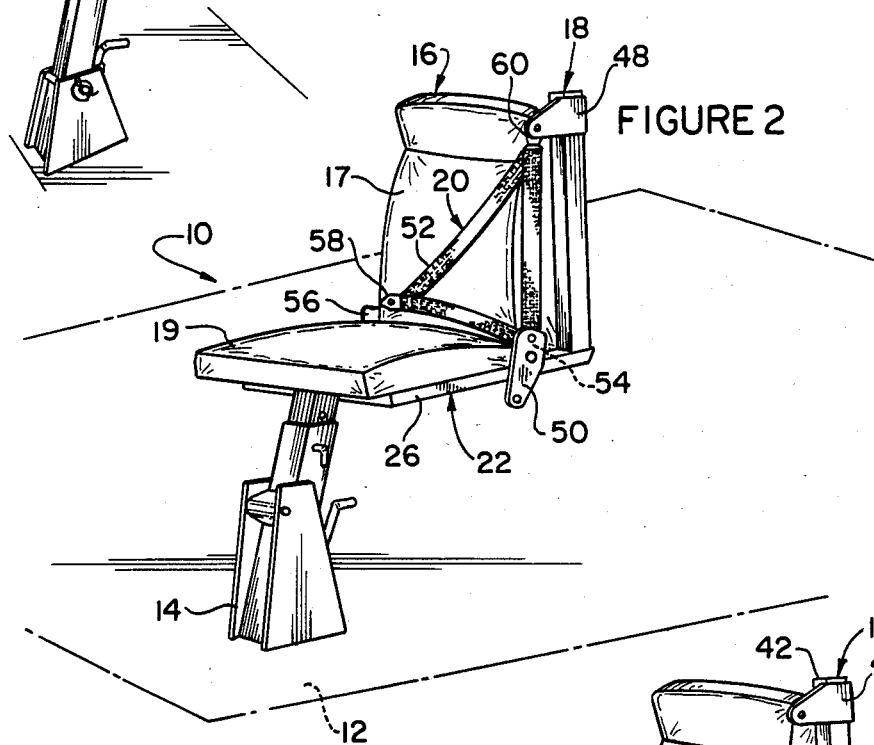
FIG. 2 is a perspective view of the seat with integral three point user restraint of the present invention.

Referring now to FIG. 2, the seat with integral three point user restraint of the present invention is shown generally at 10 mounted to a surface 12 (shown in phantom) via a seat socket 14. The surface 12 may be the floor of a walk-in van, or the like, but is not limited to it.

The seat with integral three point user restraint 10 includes a seat portion 16 having an upper cushion 17, which may be tiltable, and a lower cushion 19, a frame portion 18, and a three point restraint system 20. The three point restraint system 20 is mounted entirely and directly to the frame portion 18 of the seat portion 16 to form a self contained integral unit which allows the seat portion 16 to be adaptable to different installations, such as different sized vehicles, chassis, and seat locations without relocating the three point restraint system 20.

Figure 3:
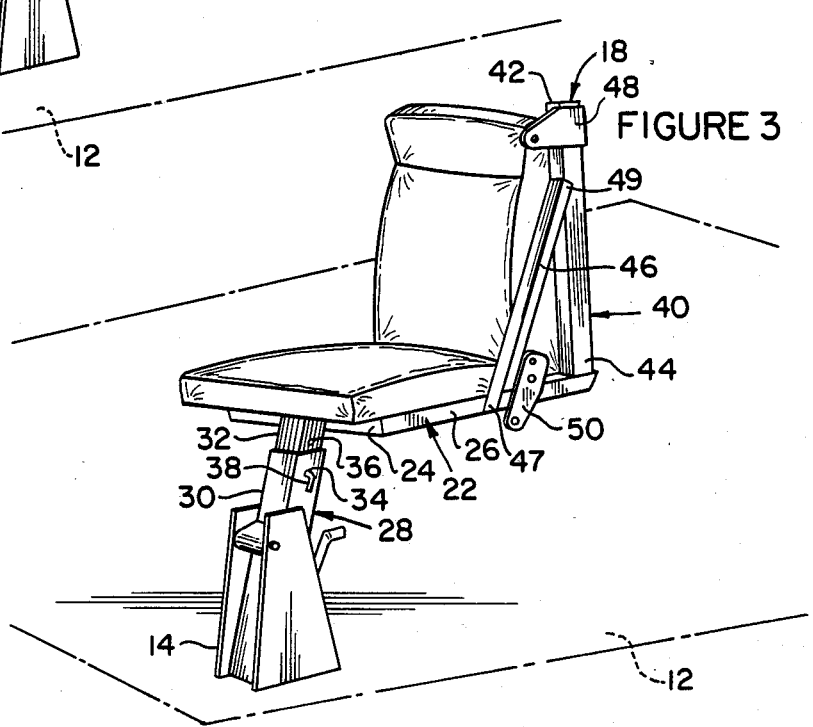
FIG. 3 is a perspective view of the seat of the present invention shown in FIG. 2 without the integral three point restraint.

The frame portion 18 can best be seen in FIG. 3. The frame portion 18 includes a seat pedestal 22 which is substantially flat and has a front surface 24 and a side surface 26. The seat pedestal 22 has a fixed end and a free end. The fixed end of the pedestal 22 is rigidly attached to the rigid frame 18 and forms a rigid integral unit. The free end of the seat pedestal 22 is easily removably mountable to the vehicle. Attached to the front surface 24 of the seat pedestal 22 is an adjustable seat holder 28. The seat holder 28 includes two telescoping members, an outer member 30, and an inner member 32. The outer member 30 and the inner member 32, both contain a series of colinear throughbores 34 and 36, respectively. The inner member 32 which is attached to the seat pedestal 22 can be slid up or down within the outer member 30, to adjust the height of the seat pedestal 19 relative to the surface 12 for user needs. Once the proper height of the seat pedestal 19 is achieved, an "L" pin 38 is inserted through the proper throughbores 34 and 36 and lock the seat holder 28 in the proper position. Attached to the side surface 26 of the seat pedestal 22 is a "D" loop mounting arm 40. The "D" loop mounting arm 40 has a free end 42 and a fixed end 44 which is attached to the side surface 26 of the seat pedestal 22. A brace 46 is attached at a one end 47 to the side surface 26 of the seat pedestal 22 and at the other end 49 to the free end 42 of the "D" loop mounting arm 40. The brace 46 further supports the "D" loop mounting arm 40. Attached to the free end 42 of the "D" loop mounting arm 40 is a "D" loop mounting bracket 48. Attached to the side 26 of the seat pedestal 22 is a retractor mounting bracket 50.

Referring now back to FIG. 2, the three point restraint system 20 is shown including a belt 52 with a reduced length. The belt 52 has a reduced length because the three point restraint system 20 is mounted entirely and directly to the frame 18 and not the surface 12 as taught by the prior art. The reduced length of the belt 52 reduces stretching and spool down of the belt 52 during impact. Since belt stretch is a percentage of the belt used, the longer a belt is, the longer it will stretch. Spool down is a tightening of the belt on the spool as the end of the belt is pulled. The spool itself is locked and will not turn, but the belt will play out of the retractor as the belt tightens on the spool. Mounted to the retractor mounting bracket 50 and hidden by same in the figure, is a belt retractor 54 which forms the first point of the three point restraint system 20. Mounted to the side opposite the side 26 of the seat pedestal 22 is a belt buckle 56. A tongue 58 slides on the belt 52 and mates with the belt buckle 56 to form the second point of the three point restraint system 20. A belt "D" loop 60 is mounted to the "D" loop bracket 48 and allows the belt 52 to pass through it and form the third point of the three point restraint system 20.

A D loop is made from a steel rod formed in the shape of the letter "D", ergo its name. The D loop is used to change the direction of the seat belt and to transmit the loads from the seat belt to a rigid structure. In the case of the present invention, in the stowed or unused position, the belt travels vertically from the retractor through the D loop and then vertically back down to the retractor mounting bracket. The tongue is placed on a bracket that slides on the segment of belt between the D loop and the retractor mounting bracket. When the occupant utilizes the three point restraint system, he takes the tongue and locates it in the buckle. This draws the segment of belt between the D loop and the retractor mounting bracket across his torso and hips, essentially making two segments of the one. During a collision the occupant applies a load to the belt. The shoulder belt applies a load to the D loop as well as to the retractor and to the fixed end on the retractor bracket. The D loop transfers the load to the mounting arm. The mounting arm transfers the load to the seat pedestal. The seat pedestal transfers the load to the holder and to the socket and then finally to the chassis.

While the invention has been illustrated and described as embodied in a seat with integral three point user restraint, it is not intended to be limited to the details above, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A three point user restraint for a vehicle seat, comprising:
   (a) a seat frame including a seat pedestal to which is mounted a means to mount the seat within a vehicle, said seat pedestal including a vertical mounting arm at the rear thereof with a brace between the pedestal and the arm to maintain the vertical extension of the mounting arm and further including a belt loop means affixed to the end of the mounting arm above said pedestal;

(b) a seat belt retractor bracket attached for pivotal movement to the side of said seat pedestal:

(c) a seat belt retractor means mounted to said retractor bracket, said seat belt retractor means including a seat belt having an end that extends upwardly from said retractor means through said belt loop means and back to said seat pedestal means on the side thereof mounting said seat belt retractor bracket:

(d) a tongue slidably mounted on said seat belt for movement therealong between said seat belt retractor means and the point of attachment of the seat belt with said pedestal: and (e) a belt buckle attached to said seat pedestal on the side thereof opposite to that to which said seat belt retractor means is mounted, said belt buckle being adapted to receive said tongue whenever it is desired to extend said seat belt over the shoulder and around the lap of a user of said seat in restraint thereof to said seat.

2. A seat, comprising:

(a) a frame portion including an intermediate member which is substantially flat and having a front surface, a first side surface, and a second side surface;

(b) a three point restraint system having a belt and being mounted entirely and directly to said frame portion so as to form a compact self-contained integral unit which allows the seat to be adaptable to different installations, such as, different sized vehicles, chassis, and seat locations, without having to relocate said three point restraint system;

(c) a readily vertically manually adjustable pedestal affixed to said front surface of said intermediate member and including an outer member containing a first series of throughbores and an inner member containing a second series of throughbores so as to form a telescoping member, said inner member sliding within said outer member for adjusting the height of the seat relative to the surface to which the seat is mountable so that the user's needs are satisfied;

(d) a seat socket affixed to the surface to which the seat is mountable and receiving said outer member of said pedestal so as to readily removably mount the seat to the surfaces of various vehicles;

(e) a "L" pin insertable through said first series of throughbores of said inner member and said second series of throughbores of said outer member so as to lock said adjustable pedestal in proper position;

(f) a "D" loop mounting arm having a free end and a fixed end and being affixed at said fixed end to said first side surface of said intermediate member;

(g) a brace having a first end and a second end and being affixed at said first end to said first side surface of said intermediate member and at said second end to said free end of said "D" loop mounting arm so that said "D" loop mounting arm is further supported;

(h) a "D" loop mounting bracket affixed to said free end of said "D" loop mounting arm;

(i) a retractor mounting bracket affixed to said first side surface of said intermediate member:

(j) a belt retractor affixed to said retractor mounting bracket and forming the first point of said three point restraint system;

(k) a belt buckle attached to said second side surface of said intermediate member;

(l) a tongue slidably attached on said belt so as to mate with said belt buckle and together forming the second point of said three point restraint system: and (m) a belt "D" loop attached to said "D" loop mounting bracket and allowing said belt to pass through it and forming the third point of said three point restraint system.

* * * * *